United States Patent [19]

Kim

[11] Patent Number: 5,497,080
[45] Date of Patent: Mar. 5, 1996

[54] ROTATION VELOSITY SENSOR FOR A TAPE REEL DISK IN WHICH LIGHT IS REFLECTED OFF OF THE REEL DISK

[75] Inventor: Jong-woo Kim, Bucheon, Rep. of Korea

[73] Assignee: Samsung Electronics Co., Ltd., Kyungki, Rep. of Korea

[21] Appl. No.: 278,223

[22] Filed: Jul. 21, 1994

[30] Foreign Application Priority Data

Aug. 16, 1993 [KR] Rep. of Korea ............. 93-15767

[51] Int. Cl.⁶ .................. G01P 3/36; G01D 5/34
[52] U.S. Cl. .................. 324/175; 250/231.14
[58] Field of Search .......... 324/175; 250/231.14, 250/227.11, 231.13

[56] References Cited

U.S. PATENT DOCUMENTS 4,387,299  6/1983  Akiyama .................. 324/175

Primary Examiner—Walter E. Snow
Attorney, Agent, or Firm—Sughrue, Mion, Zinn, Macpeak & Seas

[57] ABSTRACT

A rotation velocity sensor for a reel disk having a plurality of flat portions and grooves radially formed on the bottom of the reel disk, whereby the flat portions reflect light evenly and the grooves reflect light irregularly. Reflected light is detected to determine rotational velocity of the reel disk.

3 Claims, 3 Drawing Sheets

ROTATION VELOSITY SENSOR FOR A TAPE REEL DISK IN WHICH LIGHT IS REFLECTED OFF OF THE REEL DISK

BACKGROUND OF THE INVENTION

1. Field of the Invention

The present invention relates to a rotation velocity sensor for a reel disk used in a tape recorder, and more particularly, to an improved rotation velocity sensor for a reel disk which has fewer components and is easier to assemble.

2. Description of the Related Art

FIG. 1 illustrates a device for detecting the rotation velocity of a reel disk in a tape recorder. White light-reflecting portions 3 and black light-absorbing portions 4 are alternately and radially disposed on a reflector 2 which is attached to the bottom of a reel disk 1. A light sensor 5, emits light onto reflector 2 and detects rotation velocity variation based on the light reflected by reflector 2, so that the rotation velocity of reel disk 1, which is varied according to the winding amount of the tape, is detected.

However, the conventional rotation velocity sensor requires the reflector 2 in which light reflecting portion 3 and light absorbing portion 4 are radially and alternately arranged. This increases production cost. Further, since reflector 2 is attached to the bottom of the reel disk, assembly time is increased.

SUMMARY OF THE INVENTION

Therefore, it is an object of the present invention to provide a rotation velocity sensor for a reel disk which reduces production cost and assembly time.

To accomplish the object of the present invention, there is provided a rotation velocity sensor for a reel disk which emits light directly onto the bottom of a rotating reel disk to detect the rotation velocity of the reel disk using the light reflected from the bottom of the reel disk. A plurality of flat portions and grooves are radially formed on the bottom of the reel disk. The plurality of flat portions reflect light evenly and the plurality of grooves reflect light in a diffuse manner.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 2:
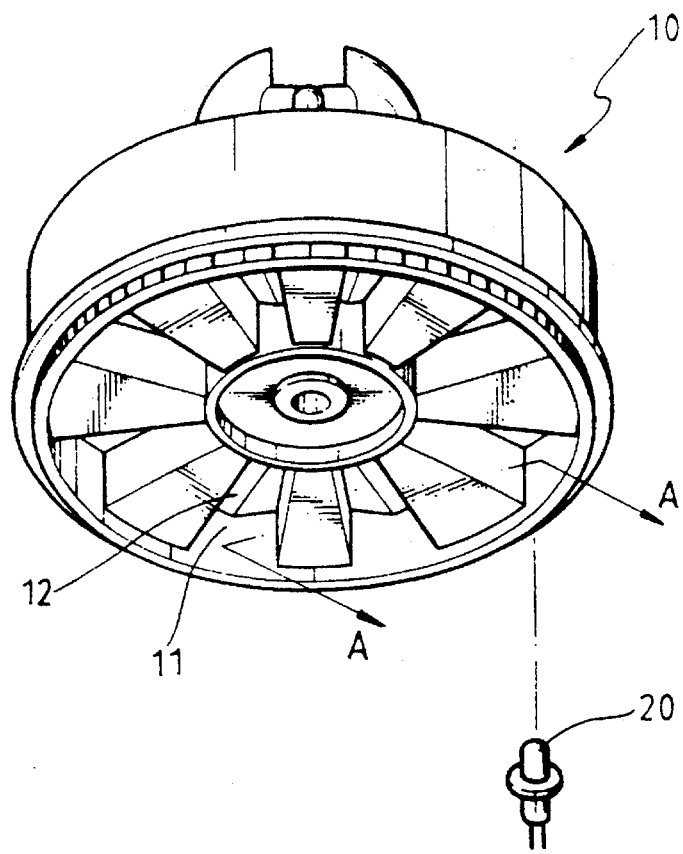
FIG. 2 is a perspective view of a rotation velocity sensor for a real disk according to a preferred embodiment of the present invention.
Figure 3:
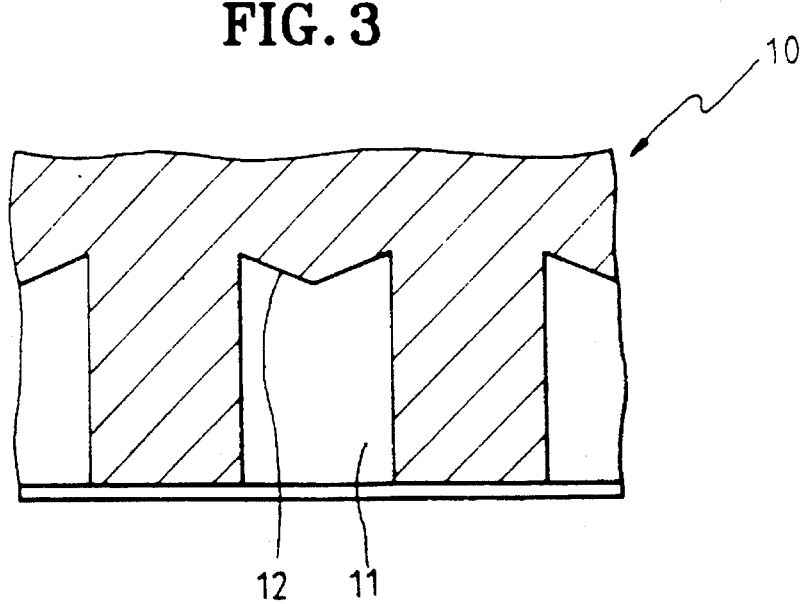
FIG. 3 is an enlarged cross-sectional view taken along line A—A of FIG. 2.

Referring to FIGS. 2 and 3, a plurality of recesses 11 are radially formed on the bottom of reel disk 10. On the bottom of recesses 11 are formed sloped surfaces 12 inclined toward either edge thereof, so as to irregularly, i.e., diffusely, reflect incident light and therefore reduce the amount of light reflected directly therefrom.

A light sensor 20 for detecting the rotation velocity variation pulses of reel disk 10 is fixedly provided under reel disk 10. Light sensor 20 emits light toward the bottom of reel disk 10 and detects light reflected therefrom. The emitted light is reflected from recesses 11 formed on the bottom of reel disk 10 as well as from portions in which the recesses are not formed.

Figure 1:
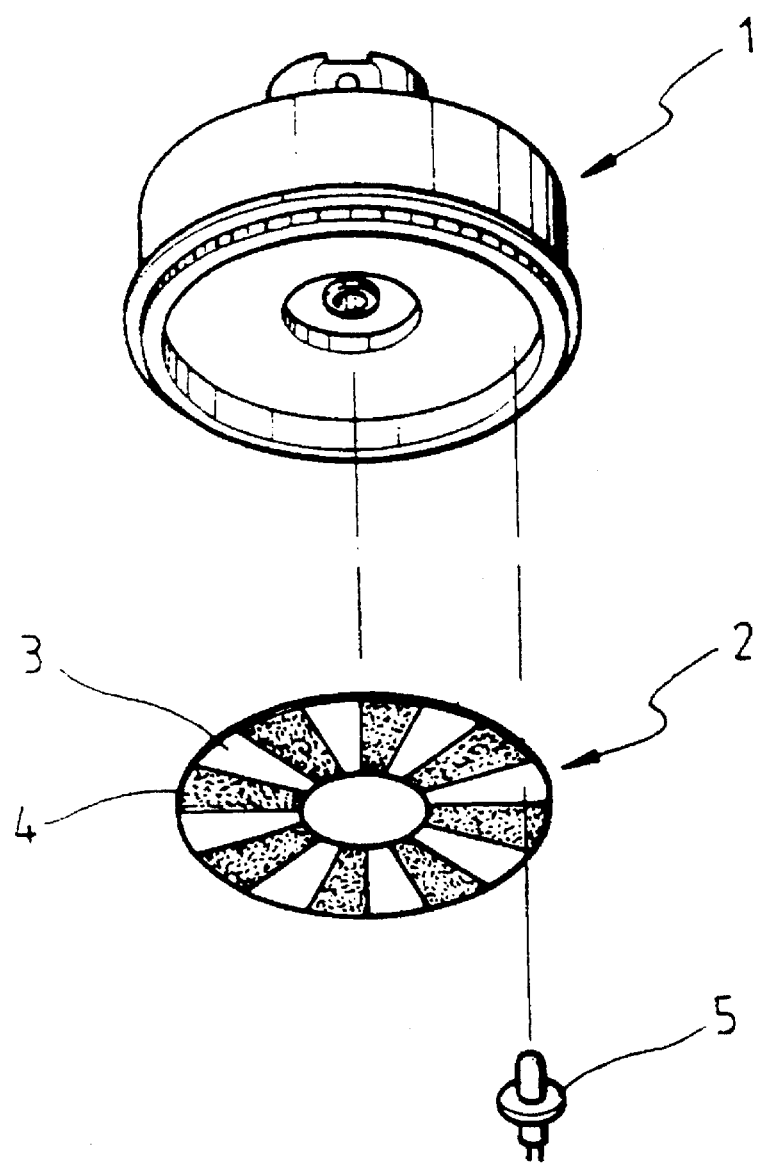
FIG. 1 is an exploded view of a conventional rotation velocity sensor.

In the preferred embodiment of the present invention, the portions in which recesses 11 are not formed in reel disk 10 function in a manner similar to the conventional light reflecting portions 3 of reflector 2 shown in FIG. 1. Recesses 11, however, reflect an amount of light which is less than that reflected from the portions in which recesses 11 are not formed, due to the height difference between the portions in which recesses 11 are not formed and the bottom of recesses 11, and the effect of sloped surfaces 12 which serve to irregularly reflect the light emitted onto the bottom of recesses 11.

FIG. 3 illustrates the grooves 11 in crosssection. The sloped surfaces 12 slope from a central portion to outer portions. However, the sloped surface, which opposes the light sensor 20, can slope in only one direction or can be arcuate or the like.

Figure 4:
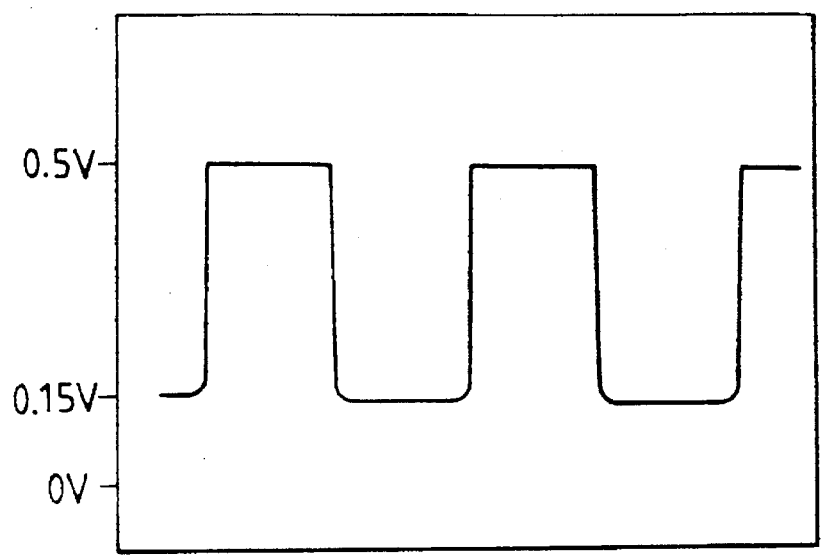
FIG. 4 illustrates a signal waveform output by the conventional rotation velocity sensor of a reel disk.
Figure 5:
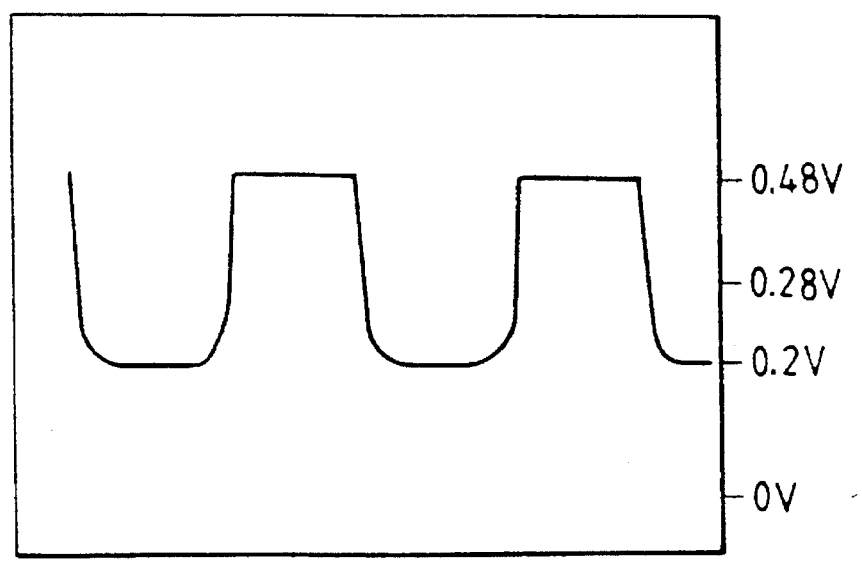
FIG. 5 illustrates a signal waveform output by the rotation velocity sensor of a reel disk of the preferred embodiment of the present invention.

FIGS. 4 and 5 illustrate the results of comparative testing of the conventional rotation velocity sensor and the rotation velocity sensor of the present invention. Comparing FIG. 4 (prior art) with FIG. 5 (the present invention), the magnitude of pulses due to regularly reflected light is slightly reduced in the preferred embodiment. However, this does not affect the detection of the rotation velocity variation of the reel disk because there is still a large contrast between the magnitude of the pulse and the base line (light reflected from recesses 11).

As described above, in the rotation velocity sensor of a reel disk of the present invention, a plurality of recesses are radially formed directly on the bottom of the reel disk in place of the conventional reflector. This eliminates the need conventional reflector, thereby reducing production cost and assembly time.

Of course, various modifications can be made without departing from the scope of the invention as defined by the appended claims.

What is claimed is:

1. A rotation velocity sensor comprising:

a reel disk;

a light source which emits light onto the bottom of said reel disk;

a light sensor which detects the rotation velocity of the reel disk by detecting the light reflected from the bottom of the reel disk;

said reel disk having a plurality of flat portions and a plurality of grooves alternately formed on the bottom of said reel disk, whereby said plurality of flat portions reflect light evenly and said plurality of grooves reflect light irregularly, each of said grooves having a sloped surface formed therein, wherein said sloped surface comprises two portions, each of said portions slopes outward toward an adjacent one of said flat portions from a central portion between two adjacent flat portions.

2. A rotation velocity sensor for a reel disk as claimed in claim 1, wherein sloped surfaces are formed in said grooves.

3. A rotation velocity sensor for a reel disk as claimed in claim 1, wherein said flat portions and said grooves are formed in an alternating manner.

* * * * *